Aug. 17, 1965  W. L. YOUNG  3,201,168
CLOSURE LATCH ARRANGEMENT
Filed Sept. 13, 1963  2 Sheets-Sheet 1

INVENTOR.
*Walter L. Young*
BY *Herbert Furman*
ATTORNEY

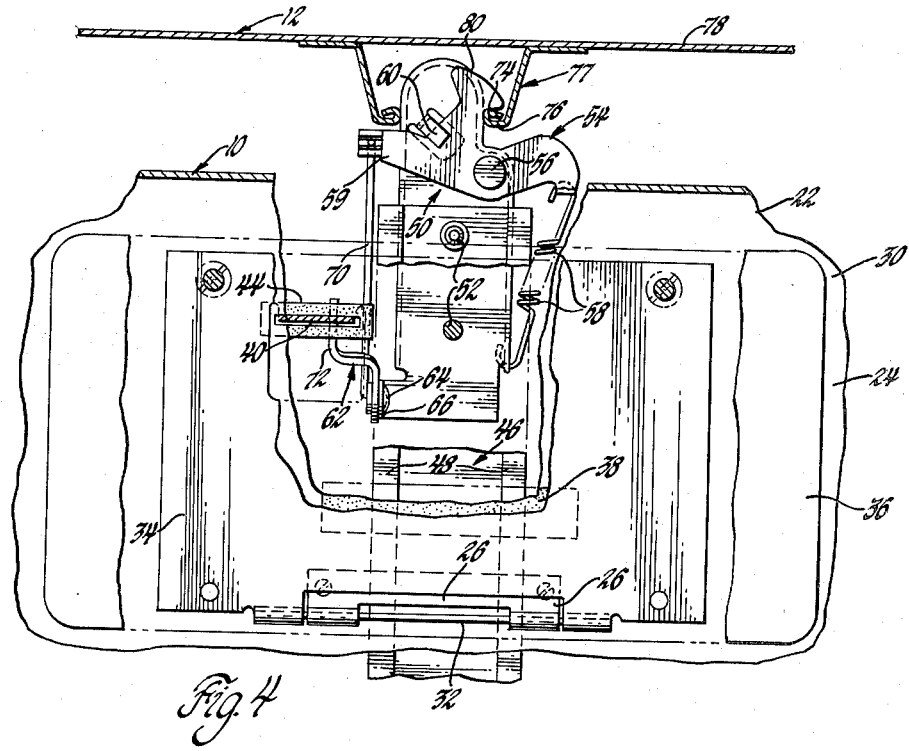
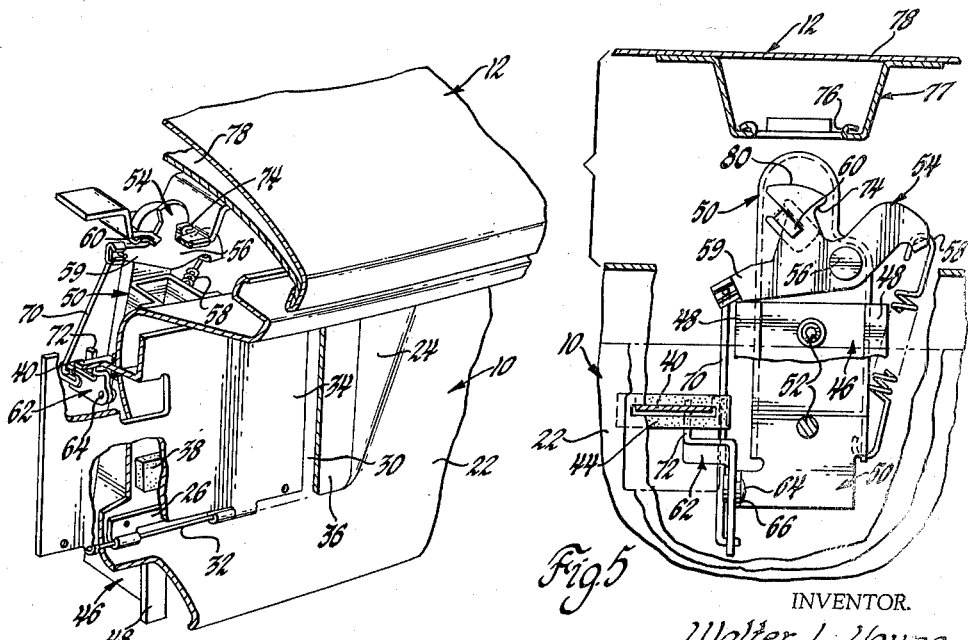

United States Patent Office 3,201,168
Patented Aug. 17, 1965

3,201,168
CLOSURE LATCH ARRANGEMENT
Walter L. Young, Birmingham, Mich., assignor to General Motors Corporation, Detroit, Mich., a corporation of Delaware
Filed Sept. 13, 1963, Ser. No. 308,754
3 Claims. (Cl. 296—1)

This invention relates to vehicles bodies and more particularly to a closure latch arrangement for vehicle bodies.

One feature of this invention is that it provides an improved vehicle body closure latch arrangement including latch means for holding a vehicle body closure in closed position and a license plate supporting bracket movably mounted on the body and operative upon movement thereof to release the latch means and permit the closure to be moved to an open position. Another feature of this invention is that the latch means are located on one side of a body wall and the license plate supporting bracket is located on the other side of the body wall and includes means extending through the wall for operating the latch means. A further feature of this invention is that the latch means includes a latch operating lever and the license plate supporting bracket is swingably mounted on the body and includes abutment means engageable with the operating lever upon swinging movement of the bracket to release the latch means. Yet another feature of this invention is that the license plate supporting bracket is biased to a normally inoperative position wherein the abutment means is located adjacent and out of engagement with the latch operating lever.

These and other features of the invention will be readily apparent from the following specification and drawings wherein:

FIGURE 4 is a partially broken away view taken generally along the plane indicated by line 4—4 of FIGURE 2;

FIGURE 5 is a view similar to FIGURE 4 showing the latch means in released poistion; and FIGURE 6 is a partially broken away perspective view.

Figure 1:
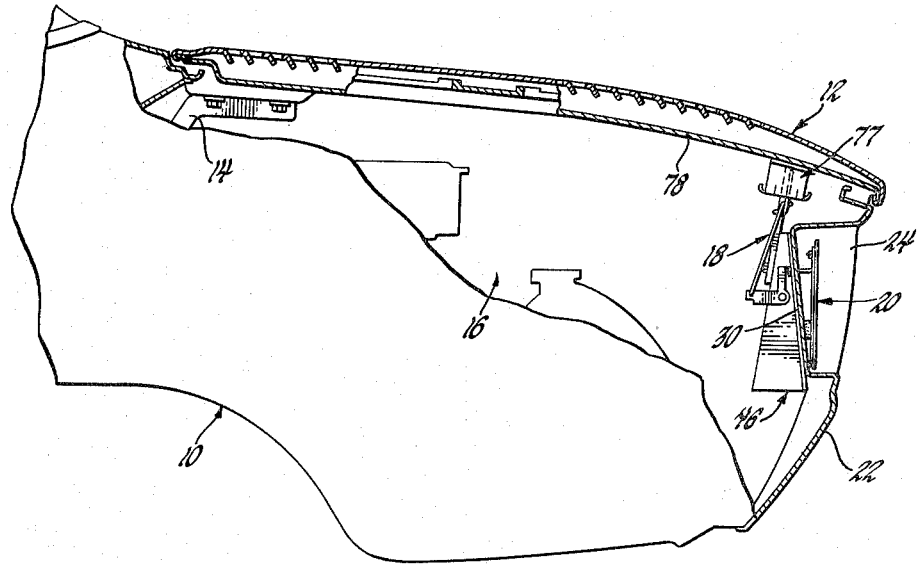
FIGURE 1 is a partially broken away partial rear elevational view of a vehicle body embodying a closure latch arrangement according to this invention.

Referring now particularly to FIGURE 1 of the drawings, a vehicle body 10 of the rear engine drive type includes a motor compartment lid or closure 12 which is swingably mounted on the body 10 by suitable hinge means 14 for movement between a closed position, as shown, and an open position, not shown, to thereby provide access to the motor compartment 16 of the body. A closure latch arrangement for closure 12 includes latch means 18 and license plate supporting means 20, as will be described.

Referring now to FIGURES 2 through 6 of the drawings, the rear wall 22 of the body 10 includes a forwardly offset housing 24 located approximately at the center line of the body to provide a housing for the rear license plate of the body. A hinge member 26 is secured at 28 to the forward or base wall 30 of housing 24 and is pivoted at 32 to the lower edge of a license plate supporting bracket 34 in order to swingably mount the bracket 34 on the body 10. As is well known, the bracket 34 supports the rear license plate 36 of the vehicle. A block of sponge rubber or other resilient material 38 is secured to the forward face of the bracket 34 to locate the bracket 34 in its normal position, as shown in full lines in FIGURE 2. An offset struck-out tab 40 of bracket 34 extends forwardly of the body through an opening 42 in the wall 30 and also through a sealing member 44 on the forward face of the wall.

A generally channel shaped support bracket 46 includes oppositely extending lateral flanges 48 which are welded or otherwise secured to the forward face of the wall 30 to one side of the opening 42 therein. A flanged latch frame or support 50 is bolted at 52 to the base wall of bracket 46 and a latch member 54 is pivoted at 56 to the frame 50. As best shown in FIGURES 4 and 5, a tension spring 58 hooked between the latch member and the frame 50 biases the latch member clockwise toward a striker engaging position, not shown, wherein a leg 59 of the latch member engages an offset tab 60 of the frame 50. An offset bell crank lever 62 is pivoted at 64 to an offset tab 66 of the frame 50, with one leg of the bell crank lever being pivotally connected by a rod 70 to the leg 59 of the latch member 54. The other leg 72 of the bell crank lever is located in the path of movement of the tab 40 of the license plate bracket, as shown in FIGURES 4 and 5.

Figure 2:
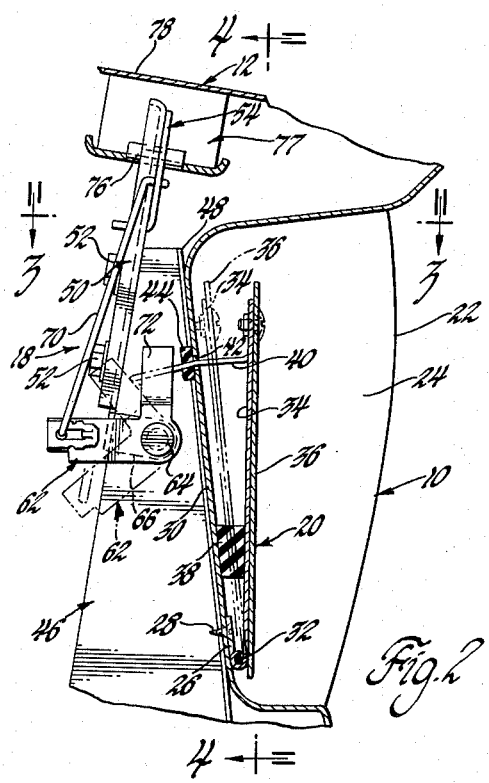
FIGURE 2 is an enlarged partially broken away view of a portion of FIGURE 1.
Figure 3:
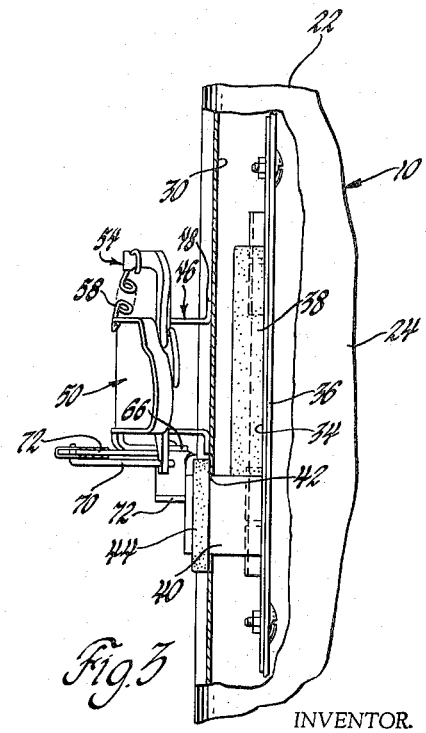
FIGURE 3 is a view taken generally along the plane indicated by line 3—3 of FIGURE 2.

Closure 12 is held in closed position by the engagement of a shoulder 74 of the latch member with a rolled edge 76 of a stamped sheet metal striker 77 which is secured to the inner panel 78 of the closure. If it is desired to release the latch member so that the closure can be moved to an open position, the operator pushes against the license plate 36 to swing the bracket 34 inwardly of housing 24 or counterclockwise to its dotted line position, as shown in FIGURE 2, so that the tab 40 engages the leg 72 of the bell crank lever and swings the bell crank lever counterclockwise to its dotted line position, as shown in FIGURE 2. This shifts the rod 70 downwardly and swings the latch member 54 counterclockwise about the pivot 56 to its released position, as shown in FIGURE 5, wherein the shoulder 74 of the latch member is out of engagement with the edge 76 of the striker so that the closure 12 can be moved to an open position. When the operator releases the license plate, the block of resilient material 38 returns the bracket 34 and the license plate 36 to normal position, as shown in full lines in FIGURE 2. The spring 58 swings the latch member 54 clockwise about the pivot 56 to striker engaging position wherein the leg 59 of the latch member engages the tab 60 and locates the cam edge 80 of the latch member in the path of movement of the rolled edge 76 of the striker member. When the closure is thereafter closed, the rolled edge 76 of the striker member cams the latch member counterclockwise against the action of the spring 56 until the rolled edge 76 engages under the shoulder 74 of the latch member to hold the closure 12 in closed position.

Thus, this invention provides an improved closure latch arrangement for vehicle bodies.

What is claimed is:

1. In a vehicle body having a closure mounted thereon for movement between open and closed positions a closure latch arrangement comprising in combination latch means mounted on one side of a body wall for holding said closure in closed position, a license plate supporting bracket movably mounted on the opposite side of said body wall, a license plate mounted on said bracket for movement therewith, and means operative through said wall upon movement of said bracket relative to said body to release said latch means and permit said closure to be moved to open position.

2. In a vehicle body having a closure mounted thereon for movement between open and closed positions, a closure latch arrangement comprising, in combination, latch means mounted on one side of a body wall for holding said closure in closed position, a license plate supporting bracket swingably mounted on the opposite side of said body wall, a license plate mounted on said bracket for movement therewith, and means coupling said bracket through said wall with said latch means to release said latch means and permit said closure to be moved to open position upon movement of said bracket relative to said body.

3. In a vehicle body having a closure mounted thereon for movement between open and closed positions, a closure latch arrangement comprising in combination, latch means mounted on one side of a body wall for holding said closure in closed position and including a latch operating lever for releasing said latch means, a license plate supporting bracket swingably mounted on the opposite side of said body wall, a license plate mounted on said bracket for movement therewith, and means on said bracket projecting through said wall and engageable with said latch operating lever upon movement of said bracket relative to said body to release said latch means and permit said closure to be moved to open position.

References Cited by the Examiner

UNITED STATES PATENTS

| | | | |
|---|---|---|---|
| 2,241,647 | 5/41 | Simon | 296—1 |
| 2,575,211 | 11/51 | Flacke | 296—76 X |
| 2,796,288 | 6/57 | Green | 296—96 |
| 2,869,918 | 1/59 | Kromer | 296—1 |
| 3,155,408 | 11/64 | Peras. | |

MILTON BUCHLER, *Primary Examiner.*

A. HARRY LEVY, PHILIP ARNOLD, *Examiners.*